United States Patent
Rainier et al.

(10) Patent No.: US 7,868,926 B2
(45) Date of Patent: Jan. 11, 2011

(54) DIGITAL CAMERA WITH AUTOMATIC FUNCTIONS

(75) Inventors: Rajiv Rainier, Escondido, CA (US); Milton Massey Frazier, San Marcos, CA (US); Christopher Daniel Russo, San Diego, CA (US); Christopher Peter Wieck, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/686,560

(22) Filed: Jan. 13, 2010

(65) Prior Publication Data
US 2010/0110263 A1 May 6, 2010

Related U.S. Application Data

(63) Continuation of application No. 11/052,668, filed on Feb. 7, 2005, now Pat. No. 7,742,079.

(51) Int. Cl.
*H04N 5/228* (2006.01)
(52) U.S. Cl. ............................ 348/222.1; 348/208.16; 348/231.6
(58) Field of Classification Search ............ 348/208.14, 348/208.16, 222.1, 231.99, 231.6, 296, 362–363
See application file for complete search history.

(56) References Cited

U.S. PATENT DOCUMENTS

| | | | |
|---|---|---|---|
| 6,592,465 B2 * | 7/2003 | Lutz et al. | 473/198 |
| 7,319,780 B2 * | 1/2008 | Fedorovskaya et al. | 382/128 |
| 2003/0160879 A1 * | 8/2003 | Robins et al. | 348/239 |
| 2003/0234885 A1 * | 12/2003 | Pilu | 348/333.01 |

* cited by examiner

*Primary Examiner*—Gevell Selby
(74) *Attorney, Agent, or Firm*—John L. Rogitz

(57) ABSTRACT

A digital camera can employ logic to delay capturing a still image after a person has operated the control button until such time as predetermined subject criteria are met, e.g., the subject is smiling with eyes open, three or more players are in the field of view to ensure a good action shot, etc.

7 Claims, 1 Drawing Sheet

US 7,868,926 B2

DIGITAL CAMERA WITH AUTOMATIC FUNCTIONS

This is a continuation of and claims priority to U.S. patent application Ser. No. 11/052,668 filed Feb. 7, 2005 now U.S. Pat. No. 7,742,079.

I. FIELD OF THE INVENTION

The present invention relates generally to digital cameras.

II. BACKGROUND OF THE INVENTION

Digital cameras can capture still images when a user manipulates a shutter button. Manipulation of the shutter button can signal a processor in the digital camera to move a shutter mechanism, similar to what occurs in non-digital cameras, to allow light to impinge on a digital imaging device, typically a charge-coupled device (CCD). The CCD in turn converts light into electric signals that are sent to the processor for generating an image. Or, in some digital cameras, opening a lens cover and activating the camera allows light to impinge on the CCD, with the signals from the CCD being used to generate a video stream of images and with manipulation of the shutter button not necessarily causing actuation of a shutter mechanism but instead signalling to the processor to "grab" one of the images in the stream as a still image. Accordingly, regardless of whether manipulation of the shutter button actually causes a shutter mechanism to "expose" the CCD or simply causes an image in a stream of images to be "grabbed", it is to be appreciated that the user establishes a still image by manipulating the shutter button to cause the processor to capture a still image.

As recognized by the present invention, digital cameras can suffer many of the same drawbacks as non-digital camera when taking a picture, namely, causing a still image to be generated at a less than opportune time for the subject. For example, the still image might be generated at the instant the subject blinks, or fails to smile. In other contexts, it might be desired to take an action photo of a sporting event, but it can be difficult, giving the fast-moving nature of the game, to generate a still image at an action point at precisely the moment the action occurs. Thus, for instance, a still image of a soccer match, instead of being generated just as the ball pierces the plane of the goal, might not be generated until the ball is already in the net. In any case, it may be appreciated that the present invention recognizes that it would be advantageous to couple the generation of a still image to one or more criteria that are subject-dependent.

SUMMARY OF THE INVENTION

A digital camera includes a housing that can have a shutter button which may be manipulated by a user to indicate a desire to generate a still image. An imaging element such as a CCD is on the housing, and a processor is on the housing for receiving signals from the digital imaging element and the shutter button. As set forth below, the processor executes logic to capture a still image only when a user has manipulated the shutter button to indicate a desire to take a picture, and when at least one predetermined subject criterion has been satisfied. By "subject criterion" is meant an attribute of the subject that is independent of the camera, i.e., that does not include whether the subject is "in focus" at the camera but rather indicates one or more attributes possessed by the subject, for example, particular facial expressions such as open eyes and smiles, or the subject being plural human subjects in an image, or yet again a ball being in the air above the ground.

In non-limiting implementations a shutter mechanism can be provided on the housing. The shutter mechanism can be movable to a picture configuration, in which light from outside the housing can impinge on the imaging element. The shutter mechanism can also be movable to a blocking configuration, in which light from outside the housing is substantially blocked from the imaging element.

In another aspect, a digital camera includes a housing, an imaging element on the housing, and a processor on the housing. The processor receives signals from the digital imaging element and accesses digital templates representing at least one predetermined subject criterion to execute logic to capture a still image from the imaging element only when the at least one predetermined subject criterion has been satisfied.

In still another aspect, a method for taking a digital picture includes receiving at least one subject criterion embodied by a digital template, and receiving a signal indicating a user desire to take a digital picture conforming to the subject criterion. The method also includes receiving an image from a CCD, comparing the image to the template, and, based on the comparison and after the reception of the signal from the user, determining whether to capture the image from the CCD.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
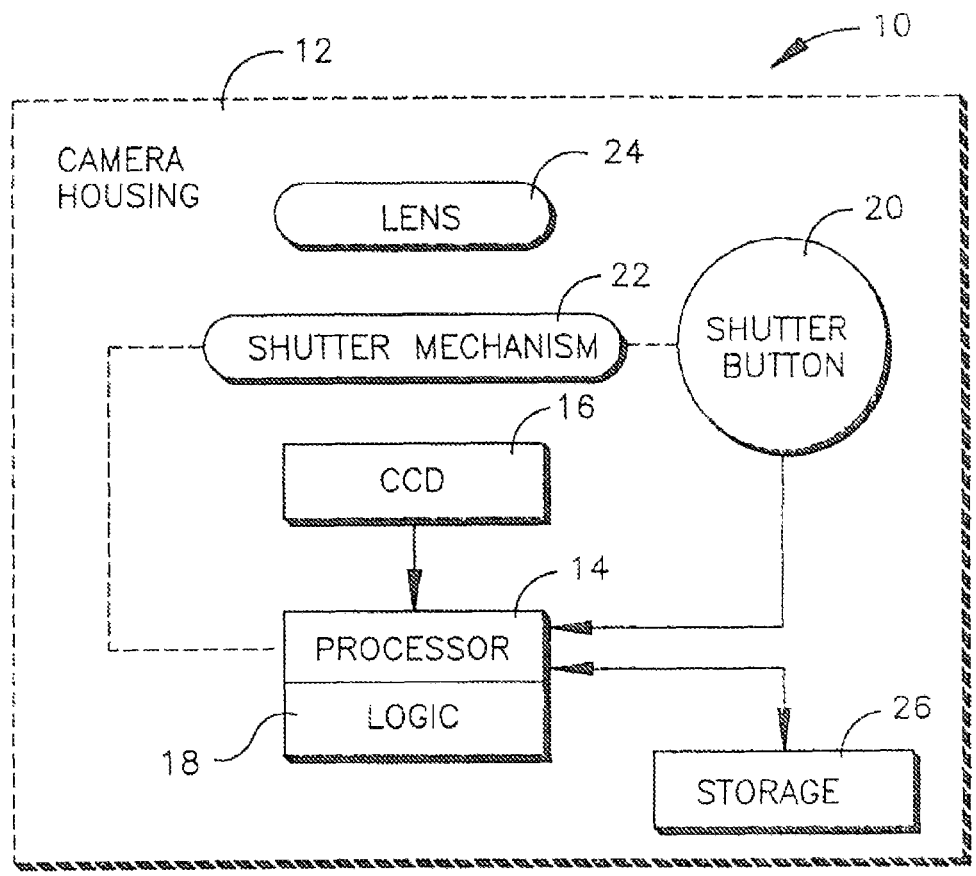
FIG. 1 shows one non-limiting camera system.

Referring initially to FIG. 1, a digital camera is shown, generally designated 10, that includes a housing 12 and a processor 14 within the housing 12. The processor 14 is a digital processor that executes logic shown herein, as well as conventionally controlling various components of the camera 10 and receiving and processing electrical signals from an imaging device such as a CCD 16 in the camera 10 to produce still images and, in some implementations, a video stream of images in accordance with digital photography principles known in the art.

The processor 14 may be implemented by plural processors if desired. The logic may be implemented on a logic module 18 accessible to the processor 14. The logic module 18 may be solid state memory or other type of memory. In any case, it is to be understood that the processor 14 executes some or all of the logic below. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor as a series of computer-executable instructions. In addition to residing on hard disk drives, these instructions may reside, for example, in RAM, or the instructions may be stored on magnetic tape, electronic read-only memory, or other appropriate data storage device.

FIG. 1 shows that a manipulable shutter button 20 is provided on the housing 12 and is electrically connected to the processor 14 to allow a user to indicate, by appropriately manipulating the shutter button 20, a desire to "take a picture" (i.e., to capture a still image). While the term "shutter button" is used herein for convention, and indeed while FIG. 1 shows that the particular non-limiting camera 10 shown may include a shutter mechanism 22 that can be moved in response to manipulation of the shutter button 20, it is to be understood that "shutter button" encompasses any user control that is manipulated or otherwise operated to receive an indication of a user's desire to have the processor 14 take a picture.

When a shutter mechanism 22 is provided, it can be movable under control of the processor 14 in response to signals from the shutter button 20 to a picture configuration, in which light from outside the housing 12 can impinge on the CCD 16. The shutter mechanism 22 is also movable to a blocking configuration, in which light from outside the housing 12 is substantially blocked from the CCD 16.

If desired, a camera lens 24 can be provided on the housing 12. The lens 24 may be movable by the processor 14 as appropriate for focus. While the shutter mechanism 22 is shown in FIG. 1 as being interposed between the lens 24 and CCD 16, its actual location in the housing 12 is not limiting. Image storage 26 can also be provided in the housing 12, either in non-movable (internal) storage form and/or in removable (e.g., disk-based) storage form. The processor 14 can store still images in the image storage 26.

Figure 2:
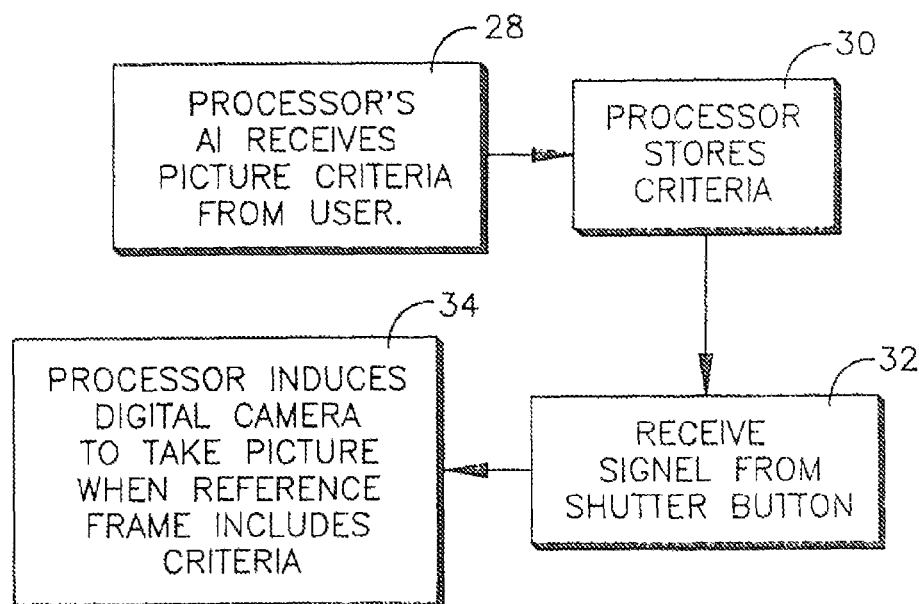
FIG. 2 is a flow chart of the present logic.

Now referring to FIG. 2, the inventive logic executed by the processor 14 is shown. Commencing at block 28, the processor 14 receives, from a user or from the vendor of the camera 10, one or more predetermined picture-taking criteria, which is then used to recognize and collect digital video data. Specifically, the criteria are subject-oriented, i.e., the criteria define subject attributes that must be present to capture a still image. Non-limiting examples of subject criteria include capturing a still image when three or more individuals enter the frame, or when an individual's facial expressions change or assume a predetermined expression, e.g., eyes open and smiling or when a ball (e.g., at a sporting event) is in the air above the ground. To this end, a menu of subject-oriented criteria can be provided to the user on a display of the camera 10, and the user can select which criteria, if any, he or she wishes to employ to capture a still image. Or, advanced users/vendors can program criteria into the camera 10, and a user can simply, select "on" or "off" to indicate whether the subject-oriented criteria are to be used or not.

It may now be appreciated that the processor 14 can employ image recognition principles, such as face recognition principles, to recognize whether the subject-oriented criteria are present. Consequently, in some embodiments the step at block 28 includes loading into the camera 10 (e.g., into the storage 26 at block 30 in FIG. 2) what can be thought of as digital templates of desired facial expressions, which can be compared later by the processor 14 to actual images generated from the CCD 16 to determine whether the actual images "match" the appropriate template within empirically established fuzzy criteria. Other templates can be included that might include plural figures in an image template. Or, "templates" may be established by and/or used in conjunction with rules, such as a rule that allows the processor to recognize ground in an image and objects of particular shapes (such as balls) that are distanced above the ground.

Moving to block 32, when a user desires that a still image be captured, the user can signal this desire by operating the shutter button 20. In some implementations, it is not necessary to operate the shutter button. Instead, the user need simply activate the camera 10 to indicate a desire to take a picture, with the CCD 16 generating a signal stream representing a constant video stream and with the processor 16 grabbing one or more frames in the stream to establish the capture of a still image whenever the subject-oriented criteria are satisfied.

In any case, once the user has evinced a desire to capture a still image using the subject-oriented criteria established at block 28, the logic flows to block 34, wherein when the processor 14 detects a match of an image from the CCD 16 to the subject-oriented criteria, the processor 14 captures the matching image and, if desired, stores it in the storage 26. After the data has been collected, the processor 14 can then provide any number of options to the user concerning processing and storage of the data. Examples of this include a user's desire to permanently store a still-frame segment from the video stream and using collected data to make a "virtual scrapbook."

While the particular DIGITAL CAMERA WITH AUTOMATIC FUNCTIONS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A digital camera, comprising:
   a housing having a shutter button thereon and manipulable by a user to indicate a user desire to generate a still image;
   at least one imaging element on the housing; and
   at least one processor on the housing and receiving signals from the digital imaging element and the shutter button, the processor executing logic to capture a still image only when a user has manipulated the shutter button to indicate a desire to take a picture, and when at least one predetermined subject criterion has been satisfied, the criterion being selectable by an end user of the camera from a list of criteria of different genres, a menu being presented on a display of the camera listing the criteria, the camera enabling the user to select from the menu to invoke at least one desired criterion.

2. The camera of claim 1, comprising at least one shutter mechanism on the housing and movable to a picture configuration, in which light from outside the housing can impinge on the imaging element, the shutter mechanism also being movable to a blocking configuration, in which light from outside the housing is substantially blocked from the imaging element, the shutter mechanism being controlled by the processor.

3. The camera of claim 1, wherein the imaging element is a CCD.

4. The camera of claim 1, wherein the subject criterion includes at least one predetermined facial expression.

5. The camera of claim 4, wherein the predetermined facial expression includes open eyes.

6. The camera of claim 4, wherein the subject criterion includes a smile.

7. The camera of claim 1, wherein the subject criterion includes a ball in the air above the ground.

* * * * *